US011060261B2

(12) United States Patent
Ueda (10) Patent No.: US 11,060,261 B2
(45) Date of Patent: Jul. 13, 2021

(54) SLEWING HYDRAULIC WORK MACHINE

(71) Applicant: KOBELCO CONSTRUCTION MACHINERY CO., LTD., Hiroshima (JP)

(72) Inventor: Koji Ueda, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 0 days.

(21) Appl. No.: 16/960,388

(22) PCT Filed: Nov. 16, 2018

(86) PCT No.: PCT/JP2018/042477
§ 371 (c)(1),
(2) Date: Jul. 7, 2020

(87) PCT Pub. No.: WO2019/142481
PCT Pub. Date: Jul. 25, 2019

(65) Prior Publication Data
US 2020/0354926 A1  Nov. 12, 2020

(30) Foreign Application Priority Data
Jan. 22, 2018 (JP) .............................. JP2018-007805

(51) Int. Cl.
*E02F 9/22* (2006.01)
*F15B 11/02* (2006.01)
(Continued)

(52) U.S. Cl.
CPC .......... *E02F 9/2203* (2013.01); *E02F 9/2278* (2013.01); *F15B 11/02* (2013.01);
(Continued)

(58) Field of Classification Search
CPC ..... E02F 9/2203; F15B 11/028; F15B 11/162; F16H 61/425; F16H 61/456; F16H 61/472
See application file for complete search history.

(56) References Cited

U.S. PATENT DOCUMENTS 5,079,919 A * 1/1992 Nakamura ............ E02F 9/2235
60/426
5,361,211 A * 11/1994 Lee ........................ E02F 9/123
340/679
(Continued)

FOREIGN PATENT DOCUMENTS

JP  62-55337 A   3/1987
JP  8-311934 A  11/1996
(Continued)

OTHER PUBLICATIONS

International Search Report dated Feb. 5, 2019 in PCT/JP2018/042477 filed on Nov. 16, 2018, 2 pages.
(Continued)

*Primary Examiner* — Abiy Teka
*Assistant Examiner* — Matthew Wiblin
(74) *Attorney, Agent, or Firm* — Oblon, McClelland, Maier & Neustadt, L.L.P.

(57) ABSTRACT

A slewing hydraulic work machine includes a slewing control device performing a slewing control in accordance with an applied slewing command operation, a boom control device performing a boom-raising control in accordance with an applied boom-raising command operation, a boom angle detector, and a capacity control section. The capacity control section calculates a command motor capacity based on a boom angle, generates a capacity command signal corresponding to the command motor capacity and inputs the signal to a slewing motor. During the performance of slewing and boom-raising operation, the capacity control
(Continued)

section sets the command motor capacity to a value equal to or less than a base capacity when the boom angle is equal to or less than a slewing priority angle and sets the command motor capacity to a value greater than the base capacity when the boom angle is greater than the slewing priority angle.

11 Claims, 6 Drawing Sheets

(51) Int. Cl.
F15B 11/028 (2006.01)
F16H 61/456 (2010.01)
F16H 61/425 (2010.01)
F16H 61/472 (2010.01)

(52) U.S. Cl.
CPC .......... *F15B 11/028* (2013.01); *F16H 61/425* (2013.01); *F16H 61/456* (2013.01); *F16H 61/472* (2013.01)

(56) References Cited

U.S. PATENT DOCUMENTS

| | | | |
|---|---|---|---|
| 2013/0213024 A1* | 8/2013 | Dengler | F16H 61/456 60/327 |
| 2014/0169923 A1* | 6/2014 | Shirao | B60W 10/06 414/685 |
| 2015/0284934 A1* | 10/2015 | Suk | E02F 9/123 60/327 |
| 2016/0131162 A1* | 5/2016 | Paakkunainen | E02F 9/2235 56/10.2 R |
| 2018/0058042 A1 | 3/2018 | Moriki et al. | |
| 2018/0328003 A1 | 11/2018 | Tsukamoto | |

FOREIGN PATENT DOCUMENTS

| | | |
|---|---|---|
| JP | 8-333778 A | 12/1996 |
| WO | WO 88/02822 A1 | 4/1988 |
| WO | WO 2017/051483 A1 | 3/2017 |
| WO | WO 2017/131189 A1 | 8/2017 |

OTHER PUBLICATIONS

Extended European Search Report dated Mar. 2, 2021 in European Patent Application No. 18900870.9, 5 pages.

* cited by examiner

SLEWING HYDRAULIC WORK MACHINE

TECHNICAL FIELD

The present invention relates to a slewing hydraulic work machine, such as a hydraulic excavator.

BACKGROUND ART

A slewing hydraulic work machine generally includes a lower travelling body, an upper slewing body slewably mounted on the lower travelling body, a working device attached to the upper slewing body, a slewing motor that is a hydraulic motor for slewing the upper slewing body, a hydraulic pump for discharging hydraulic fluid to be supplied to the slewing motor, and a slewing control valve interposed between the hydraulic pump and the slewing motor. The slewing control valve is opened and closed in response to the operation applied to a slewing control lever by an operator, changing the flow rate of hydraulic fluid that is discharged from the hydraulic pump and further supplied to the slewing motor.

The hydraulic fluid discharged by the hydraulic pump is often used not only for the slewing motor but also used for driving (e.g. increasing speed of) a hydraulic actuator other than the slewing motor, specifically a boom cylinder for raising and lowering a boom included in the working device. In this case, the boom cylinder is connected to the hydraulic pump in parallel with the slewing motor via a boom control valve independent of the slewing control valve. Thus, the hydraulic pump is used both for supplying hydraulic fluid to the slewing motor and for supplying hydraulic fluid to the boom cylinder.

In such type of the work machine, it is important to appropriately allocate the flow rate of the hydraulic fluid discharged from the hydraulic pump to the slewing motor and the boom cylinder when the slewing operation and a boom operation for raising or lowering the boom are performed simultaneously, that is, when combined operations are performed. Patent Literature 1 discloses, as means for controlling the above-mentioned allocation of flow rate, adopting a variable displacement hydraulic motor as the slewing motor, calculating a absorbed flow rate of the slewing motor (namely, the motor capacity) based on respective values, which are input in advance, of a target slewing angle, a boom raising height, the moment of inertia of the slewing body, and changing the capacity of the slewing motor to yield the calculated absorbed flow rate.

However, the advance input operation and the arithmetic control based on the input, which are involved by the work machine disclosed in Patent Literature 1, are not easy to perform. Specifically, the work machine requires advanced input of respective values of the target slewing angle to be yielded for slewing and raising a bucket to a target slewing position and height position, the raising height of the boom, and the moment of inertia of the slewing body, imposing a great burden on the operator. Moreover, complex arithmetic control has to be conducted based on the input values, involving a significant increase in cost. Furthermore, since the moment of inertia of the slewing body is dependent on the position of the working device and further the weight of soil in the bucket and the like, it is difficult to input the accurate value of the moment of inertia of the slewing body and to calculate an appropriate motor capacity based on that value. Hence, there is a need for providing a technique that effectively improves the working efficiency with simplified arithmetic control.

CITATION LIST

Patent Literature

Patent Literature 1: Japanese Unexamined Patent Publication No. Sho 62-55337

SUMMARY OF INVENTION

It is an object of the present invention to provide a stewing hydraulic work machine capable of efficiently performing stewing and boom-raising work where a stewing motion of an upper stewing body and a rising motion of a boom are simultaneously made by use of hydraulic fluid discharged from a common hydraulic pump, with simple control.

As means for achieving the above-mentioned object, the inventors of the present invention have focused on the relationship between the rising angle of the boom and required boom-rising speed and stewing speed in the stewing and boom-raising work. Specifically, when the rising angle of the boom is small to bring a working device into a low position, that is, when the rising angle of the boom is presumed to be significantly away from a target angle, the boom has to make rising motion to the proper height at a sufficient speed in synchronization with the stewing operation of the upper stewing body; however, when the rising angle of the boom is enough large to locate the working device at a relatively high position, that is, when the rising angle of the boom is presumed to be close to the target angle to some extent, it is allowable to reduce the boom-rising speed to increase the stewing speed by corresponding amount to thereby improve the working efficiency.

The present invention has been made in view of the above-mentioned points. Provided is a stewing hydraulic work machine, comprising: a lower travelling body; an upper stewing body slewably mounted on the lower travelling body; a working device mounted on the upper stewing body and including a boom connected to the upper slewing body so as to be raisable and lowerable; a hydraulic pump that discharges hydraulic fluid; a stewing motor formed of a variable displacement hydraulic motor that is driven by hydraulic fluid supplied from the hydraulic pump, the stewing motor configured to slew the upper slewing body in response to the supply of hydraulic fluid; a slewing control device that controls a direction and a flow rate of hydraulic fluid supplied from the hydraulic pump to the slewing motor in accordance with a slewing command operation applied to the slewing control device for slewing the upper slewing body; a boom cylinder that is operated, by hydraulic fluid supplied from the hydraulic pump to raise and lower the boom; a boom control device that controls a flow rate of the hydraulic fluid supplied from the hydraulic pump to the boom cylinder in accordance with a boom-raising command operation applied to the boom control device for actuating the boom in a rising direction; a boom angle detector that detects a boom angle that is a rising angle of the boom; and a capacity control section that controls a slewing motor capacity, which is a capacity of the slewing motor. The capacity control section includes a command motor capacity calculation section that calculates a command motor capacity, which is a command value on the slewing motor capacity, based on the boom angle detected by the boom angle detector, and a command signal input section that generates a capacity command signal corresponding to the command motor capacity and inputs the capacity command signal to the slewing motor to thereby make the slewing motor capacity be a capacity corresponding to the command motor capacity. The command motor capacity calculation section is configured to set the command motor capacity to a predetermined base capacity or a capacity less than the base capacity when the boom angle is equal to or less than a predetermined slewing priority angle during a performance of a slewing and boom-raising operation in which the slewing command operation is applied to the slewing control device and the boom-raising command operation is applied to the boom control device simultaneously, and configured to set the command motor capacity to a value greater than the base capacity if the boom angle is greater than the slewing priority angle when the boom angle is greater than the slewing priority angle during the performance of the slewing and boom-raising operation.

DESCRIPTION OF EMBODIMENTS

Below will be described a preferred embodiment of the present invention with reference to the accompanying drawings.

Figure 1:
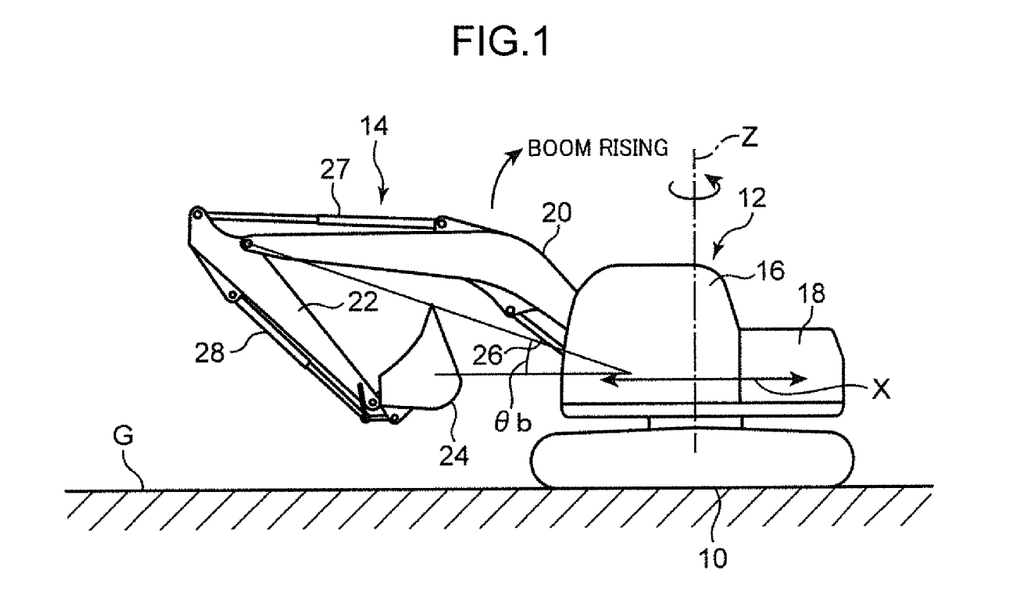
FIG. 1 is a diagram showing a hydraulic excavator that is an example of a hydraulic work machine according to an embodiment of the present invention.

FIG. 1 shows a hydraulic excavator according to the embodiment. The present invention, which does not have to be applied to the hydraulic excavator described herein, can be widely applied to various types of work machines each including an upper slewing body and being driven mainly by hydraulic pressure.

The hydraulic excavator includes a lower travelling body 10 capable of travelling on a ground surface G, an upper slewing body 12 mounted on the lower travelling body 10 so as to be able to slew about a vertical axis Z, and a working device 14 mounted on the upper slewing body 12. The upper slewing body 12 has a front portion, with respect to a front and rear direction thereof, in which a cab 16 as an operator's compartment and the working device 14 are disposed and a rear portion in which an engine room 18 is disposed.

The working device 14 includes a boom 20, an arm 22, and a bucket 24. The boom 20 has a proximal end, that is supported on a front end of the upper slewing body 12 so as to be raisable and lowerable, i.e. so as to be capable of vertically rotational movement about a horizontal axis, and a distal end opposite to the proximal end. The arm 22 has a proximal end connected to the distal end of the boom 20 so as to be capable of rotational movement about a horizontal axis and a distal end opposite to the proximal end. The bucket 24 is attached to the distal end of the arm 22 so as to be capable of rotational movement and configured to mainly make an excavation motion.

Figure 2:
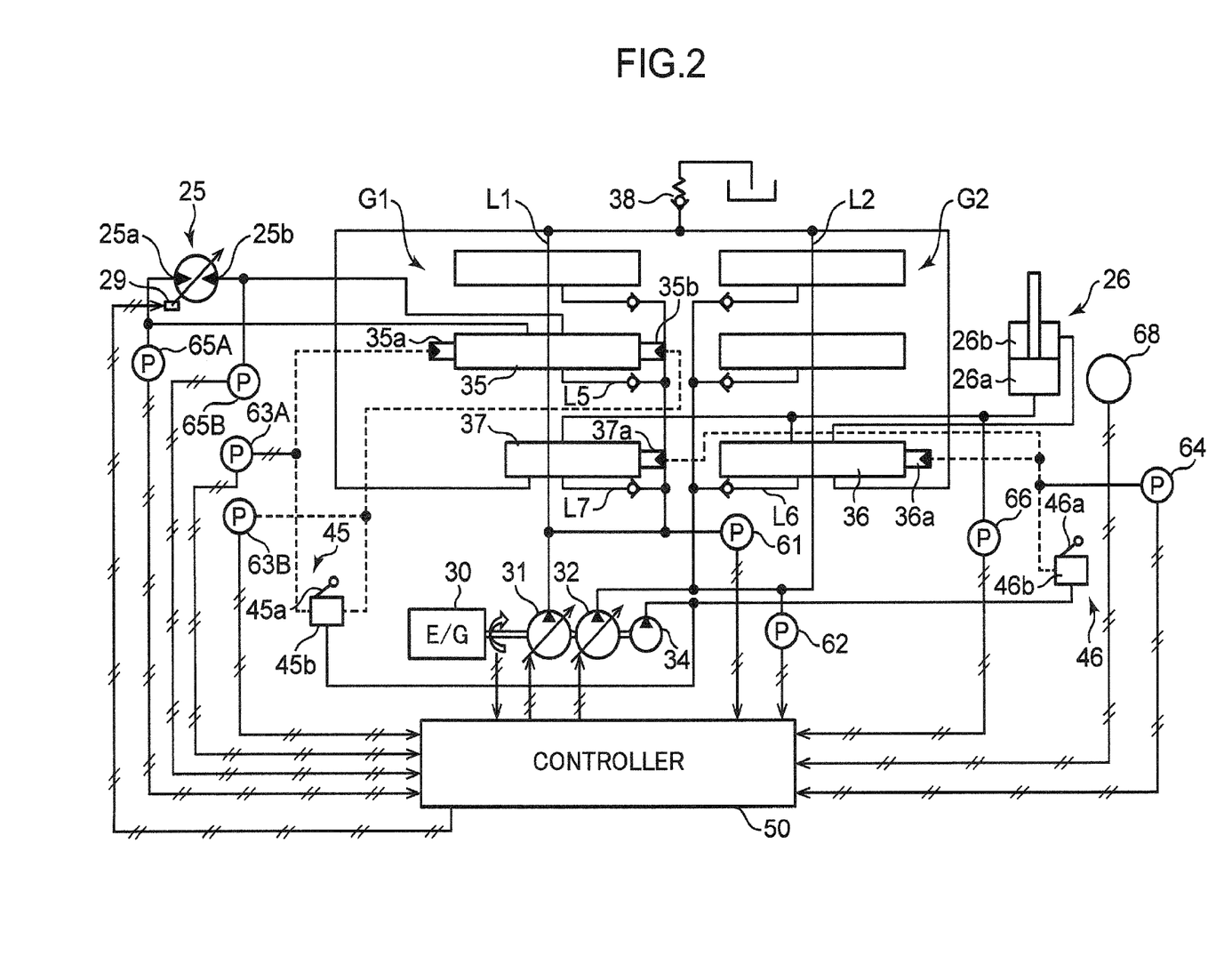
FIG. 2 is a diagram showing a hydraulic circuit installed on the hydraulic excavator.

The hydraulic excavator includes main hydraulic actuators, namely, a plurality of hydraulic cylinders expandable and retractable to actuate the working device 14 and a slewing motor 25 to slew the upper slewing body 12, the slewing motor 25 shown in FIG. 2. The plurality of hydraulic cylinders include a boom cylinder 26, an arm cylinder 27, and a bucket cylinder 28. The cylinders 26 to 28 are activated to expand and retract by hydraulic fluid supplied thereto, actuating their respective driving objects. For example, the boom cylinder 26 is interposed between the boom 20 and the upper slewing body 12 so as to actuate the boom 20 upward and downward by the expansion and retrmotion thereof. The slewing motor 25 is activated by hydraulic fluid supplied thereto, so as to slew the upper slewing body 12.

FIG. 2 shows a hydraulic circuit installed on the hydraulic excavator. The hydraulic circuit has a function of supplying hydraulic fluid to a plurality of hydraulic actuators including the slewing motor 25 and the boom cylinder 26 and control the direction and the flow rate of the supplied hydraulic fluid. Specifically, the hydraulic circuit includes: a plurality of pumps connected to an output shaft of an engine 30, namely, a first main pump 31, a second main pump 32 and a pilot pump 34; a plurality of actuator control valves; and a plurality of actuator operation units. Further, the hydraulic circuit is electrically connected to a controller 50 provided for controlling the operation of the hydraulic circuit.

The slewing motor 25 includes an output shaft that is rotationally driven by hydraulic fluid supplied thereto and connected to the upper slewing body 12 so as to slew the upper stewing body 12 either of rightward and leftward. Specifically, the stewing motor 25 includes a first port 25a and a second port 25b opposite thereto, wherein the output shaft is rotated in a direction corresponding to one port of the first and second ports 25a and 25b by hydraulic fluid supplied to the one port while hydraulic fluid is discharged through the other port.

The slewing motor 25 is formed of a variable displacement hydraulic motor having a regulatable capacity, namely, a slewing motor capacity. The slewing motor 25 includes a regulator 29, which allows a capacity command signal to be input thereto and adjusts the stewing motor capacity to a capacity corresponding to the capacity command signal.

The boom cylinder 26 includes a bottom chamber 27a and a rod chamber 27b opposite thereto. The boom cylinder 26 is expanded by hydraulic fluid supplied to the bottom chamber 27a to actuate the boom 20 upward while discharging hydraulic fluid from the rod chamber 27b. The boom cylinder 26 is retracted by hydraulic fluid supplied to the rod chamber 27b to actuate the boom 20 downward while discharging hydraulic fluid from the bottom chamber 27a.

Each of the pumps 31, 32, and 34 is driven by the engine 30 to discharge fluid stored in a tank. The first and second main pumps 31 and 32 discharge hydraulic fluid for directly driving a target hydraulic actuator selected from the plurality of hydraulic actuators. The pilot pump 34 discharges pilot fluid to supply a pilot pressure to the plurality of actuator control valves. Each of first and second main pumps 31 and 32 according to the present embodiment is formed of a variable displacement hydraulic pump having a capacity, namely, a pump capacity, which is controlled by a control signal input thereto from the controller 50.

Each of the plurality of actuator control valves is disposed between the first main pump 31 or the second main pump 32 and the hydraulic actuator corresponding thereto, and operated to control the direction and the flow rate of the hydraulic fluid supplied from the first main pump 31 or the second main pump 32 to the hydraulic actuator corresponding thereto. Each of the plurality of actuator control valves is formed of a pilot-operated hydraulic selector valve and configured to be opened by pilot pressure supplied thereto by a stroke distance corresponding to the pilot pressure to allow hydraulic fluid to be supplied to the hydraulic actuator at a flow rate corresponding to the stroke distance. This enables the flow rate to be controlled by changing the pilot pressure.

Each of the plurality of actuator control valves according to the present embodiment belongs to either a first group G1 to which mainly hydraulic fluid discharged from the first main pump 31 is supplied or a second group G2 to which mainly the hydraulic fluid discharged from the second main pump 32 is supplied. Specifically, to the discharge port of the first main pump 31 is connected a first center bypass line L1 that is communicated with the tank through a back pressure valve 38, and the actuator control valves belonging to the first group G1 are disposed in tandem along the first center bypass line L1. Similarly, to the discharge port of the second main pump 32 is connected a second center bypass line L2 that is communicated with the tank through the back pressure valve 38, and the actuator control valves belonging to the second group G2 are disposed in tandem along the second center bypass line L2.

The plurality of actuator control valves include a slewing control valve 35 connected to the slewing motor 25, and a boom control valve 36 and a boom-raising speed-increasing control valve 37 that are connected to the boom cylinder 26. The slewing control valve 35 and the boom-raising speed-increasing control valve 37 belong to the first group G1 and the boom control valve 36 belongs to the second group G2.

The slewing control valve 35 introduces hydraulic fluid from the first main pump 31 for driving the slewing motor 25 to one port selected from the first port 25a and the second port 25b of the slewing motor 25, and controls a slewing flow rate that is the flow rate of the hydraulic fluid supplied to the slewing motor 25. The slewing control valve 35 is formed of a three-way pilot selector valve, having a pair of stewing pilot ports 35a and 35b. With no or only minute pilot pressure supplied to each of the slewing pilot ports 35a and 35b, the slewing control valve 35 is held at a neutral position to block the communication between the first main pump 31 and the slewing motor 25 while opening the first center bypass line L1. By a pressure above a certain level supplied to one pilot port of the stewing pilot ports 35a and 35b, the slewing control valve 35 is shifted from the neutral position in a direction corresponding to the one pilot port by a stroke distance corresponding to the magnitude of the pilot pressure to connect a slewing supply line L5 branching from the first center bypass line L1 with the first port 25a or the second port 25b and to throttle the first center bypass line L1 to a degree corresponding to the stroke distance, thereby causing the slewing motor 25 to be driven in the direction and at the rate corresponding to the stroke distance.

The boom control valve 36 is a valve to introduce hydraulic fluid discharged from the second main pump 32 to the boom cylinder 26 as main hydraulic fluid for expanding and retracting the boom cylinder 26, disposed between the second main pump 32 and the boom cylinder 26. The boom control valve 36 is formed of a three-way pilot selector valve, having a boom-raising pilot port 36a and a not-graphically-shown boom-lowering pilot port opposite thereto. With no or only minute pilot pressure supplied to each of the boom-raising pilot port 36a and the boom-lowering pilot port, the boom control valve 36 is held at a neutral position to block communication between the second main pump 32 and the boom cylinder 26 while opening the second center bypass line L2. By a pilot pressure above a certain level supplied to the boom-raising pilot port 36a, the boom control valve 36 is shifted from the neutral position to a boom-raising position by a stroke distance corresponding to the magnitude of the pilot pressure, thereby connecting, at the boom-raising position, a boom supply line L6 branching from the second center bypass line L2 with the bottom chamber 26a of the boom cylinder 26 to allow hydraulic fluid from the second main pump 32 to be supplied to the bottom chamber 26a at a flow rate corresponding to the stroke distance. Conversely, when a pilot pressure is supplied to the boom-lowering pilot port, the boom control valve 36 connects the boom supply line L6 with the rod chamber 26b of the boom cylinder 26 to allow hydraulic fluid from the second main pump 32 to be supplied to the rod chamber 26b.

The boom-raising speed-increasing control valve 37 introduces hydraulic fluid from the first main pump 31 for increasing the speed of the upward drive of the boom 20 to the bottom chamber 26a of the boom cylinder 26, in addition to the hydraulic fluid supplied to the boom cylinder 26 through the boom control valve 36, and controls the flow rate of the hydraulic fluid. The boom-raising speed-increasing control valve 37 is formed of a two-way pilot selector valve, having a single speed-increasing pilot port 37a. With no or only minute pilot pressure supplied to the speed-increasing pilot port 37a, the boom-raising speed-increasing control valve 37 is held at a neutral position to block communication between the first main pump 31 and the boom cylinder 26 while opening the first center bypass line L1. By a pilot pressure above a certain level supplied to the speed-increasing pilot port 37a, the boom-raising speed-increasing control valve 37 is shifted from the neutral position to a boom-raising speed-increasing position by a stroke distance corresponding to the magnitude of the pilot pressure, thereby connecting, at the boom-raising speed-increasing position, a confluence line L7 branching from the first center bypass line L1 with the bottom chamber 26a of the boom cylinder 26 and throttle the first center bypass line L1 to a degree corresponding to the stroke distance, to allow hydraulic fluid from the first main pump 31 to be supplied to the bottom chamber 26a, that is, to allow hydraulic fluid from the first main pump 31 to be joined with the hydraulic fluid supplied from the second main pump 32 to the bottom chamber 26a, at a flow rate corresponding to the stroke distance. This causes the speed of the boom cylinder 26 driven upward to be increased to a degree corresponding to the stroke distance.

Opening the boom-raising speed-increasing control valve 37, thus, forms a line that allows hydraulic fluid to be supplied, in parallel, to the slewing motor 25 and the boom cylinder 26 from the common hydraulic pump, namely, the first main pump 31.

The plurality of actuator operation units are disposed between the plurality of actuator control valves and the pilot pump 34, respectively, each being configured to allow a command operation for operating the actuator control valve corresponding to the actuator operation unit (i.e. for driving the hydraulic actuator corresponding to the actuator operation unit) to be applied thereto and to allow a pilot pressure having a magnitude corresponding to the applied command operation to be input to the pilot port of the actuator control valve from the pilot pump 34 through the actuator operation unit.

The plurality of actuator operation units include a slewing operation unit 45 and a boom operation unit 46 as the operation units to which respective command operations for the slewing motor 25 and the boom cylinder 26 are applied.

The slewing operation unit 45 allows a slewing command operation for driving the slewing motor 25 to be applied thereto and is operated to allow a pilot pressure corresponding to the applied slewing command operation from the pilot pump 34 to one pilot port selected from the slewing pilot port 35a and the slewing pilot port 35b of the slewing control valve 35. Specifically, the slewing operation unit 45 includes an operation member movable by the slewing command operation, which is a slewing control lever 45a capable of rotational movement in this embodiment, and a slewing pilot valve 45b disposed between the pilot pump 34 and the slewing pilot ports 35a and 35b. With no operation applied to the slewing control lever 45a to leave it at a neutral position, the slewing pilot valve 45b is closed to block communication between the pilot pump 34 and the slewing pilot ports 35a and 35b; by a rotational operation applied to the slewing control lever 45a to shift it from the neutral position, the slewing pilot valve 45b is opened to supply a pilot pressure corresponding to the amount of the rotational operation to the pilot port that is one of the slewing pilot ports 35a and 35b and corresponds to the direction of the rotational operation.

The slewing operation unit 45 and the slewing control valve 35, thus, constitute a slewing control device that controls the direction and the flow rate of hydraulic fluid supplied from the first main pump 31 to the slewing motor 25 in accordance with the slewing command operation applied to the slewing control device to slew the upper slewing body 12.

The boom operation unit 46 is configured to allow a boom command operation for driving the boom cylinder 26 to be applied to the boom operation unit 46 and to allow a pilot pressure corresponding to the applied boom command operation to be supplied from the pilot pump 34 to at least the pilot port of the boom control valve 36 among respective pilot ports of the boom control valve 36 and the boom-raising speed-increasing control valve 37. Specifically, the boom operation unit 46 includes an operation member movable by the boom command operation, which is a boom control lever 46a capable of rotational movement in this embodiment, and a boom pilot valve 46b disposed between the pilot pump 34 and both the boom-raising pilot port 36a and the boom-lowering pilot port of the boom control valve 36 and the speed-increasing pilot port 37a of the boom-raising speed-increasing control valve 37.

With no operation applied to the boom control lever 46a to leave it at a neutral position, the boom pilot valve 46b is closed to block communication between the pilot pump 34 and each of the above-mentioned pilot ports. On the other hand, by the rotational operation applied to the boom control lever 46a to shift it from the neutral position in a boom-raising command direction (i.e. by the boom raising command operation applied thereto), the boom pilot valve 46b is opened to supply a pilot pressure corresponding to the amount of the rotational operation, as a boom-raising pilot pressure, to the boom-raising pilot port 36a of the boom control valve 36 and the speed-increasing pilot port 37a of the boom-raising speed-increasing control valve 37. Conversely, by a rotational operation applied to the boom control lever 46a to shift it from the neutral position in a boom-lowering command direction, the boom pilot valve 46b is opened to supply a pilot pressure corresponding to the amount of the rotational operation, as a boom-lowering pilot pressure, to the boom-lowering pilot port of the boom control valve 36.

The boom operation unit 46 and the boom-raising speed-increasing control valve 37, thus, constitute a boom control device that controls the direction and the flow rate of hydraulic fluid supplied from the first main pump 31 to the boom cylinder 26 in accordance with the boom-raising command operation applied to the boom control device to actuate the boom 26 in the rising direction.

The hydraulic excavator according to the present embodiment further includes a plurality of pressure sensors shown in FIG. 2. The plurality of pressure sensors include a first pump pressure sensor 61 that generates a first pump pressure detection signal corresponding to the discharge pressure of the first main pump 31, a second pump pressure sensor 62 that generates a second pump pressure detection signal corresponding to the discharge pressure of the second main pump 32, a pair of slewing pilot pressure sensors 63A and 63B that generates slewing respective pilot pressure detection signals corresponding to respective slewing pilot pressures input to the slewing pilot ports 35a and 35b, a boom-raising pilot pressure sensor 64 that generates boom-raising pilot pressure detection signals corresponding to respective boom-raising pilot pressures input to the boom-raising pilot port 36a and the speed-increasing pilot port 37a, a first motor pressure sensor 65A that generates a first motor pressure detection signal corresponding to the pressure of hydraulic fluid at the first port 25a of the slewing motor 25, a second motor pressure sensor 65B that generates a second motor pressure detection signal corresponding to the pressure of hydraulic fluid at the second port 25b of the slewing motor 25, a boom bottom pressure sensor 66 that generates a boom bottom pressure detection signal corresponding to a boom bottom pressure Pb, which is a pressure of hydraulic fluid at the bottom chamber 26a of the boom cylinder 26, and a boom angle sensor 68 that generates a boom angle detection signal corresponding to a boom angle $\theta b$, which is the rising angle of the boom 20.

Among the above-mentioned pressure sensors, the boom angle sensor 68 corresponds to a boom angle detector, and the first and second motor pressure sensors 65A and 65B correspond to a motor differential pressure detector that detects an effective differential pressure of the slewing motor 25. The boom bottom pressure sensor 66 corresponds to a boom-raising driving pressure detector that detects the boom-raising driving pressure, which is a pressure of the hydraulic fluid supplied to the boom cylinder 26 for a boom-raising operation, namely, the boom bottom pressure Pb.

The detection signal generated by each of the above-mentioned pressure sensors is input to the controller 50. The controller 50 has a function as a capacity control section that controls respective capacities of the first and second main pumps 31 and 32 based on the first and second pump pressure detection signals and each of the pilot pressure detection signals and controls the capacity of the slewing motor 25, namely, the slewing motor capacity, based on each of the pilot pressure detection signals, the boom angle detection signal, and the boom bottom pressure detection signal and the like. The slewing motor capacity is an important factor that influences the ratio of the flow rate of the hydraulic fluid supplied to the slewing motor 25 to the flow rate of the hydraulic fluid supplied to the bottom chamber 26a during the performance of a slewing and boom-raising operation in which the slewing command operation is applied to the slewing control lever 45a and the boom-raising command operation is applied to the boom control lever 46a simultaneously, i.e. when the slewing control valve 35 and the boom-raising speed-increasing control valve 37 are opened simultaneously to supply the hydraulic fluid discharged from the first main pump 31 to both the stewing motor 25 and the bottom chamber 26a of the boom cylinder 26 simultaneously.

Figure 3:
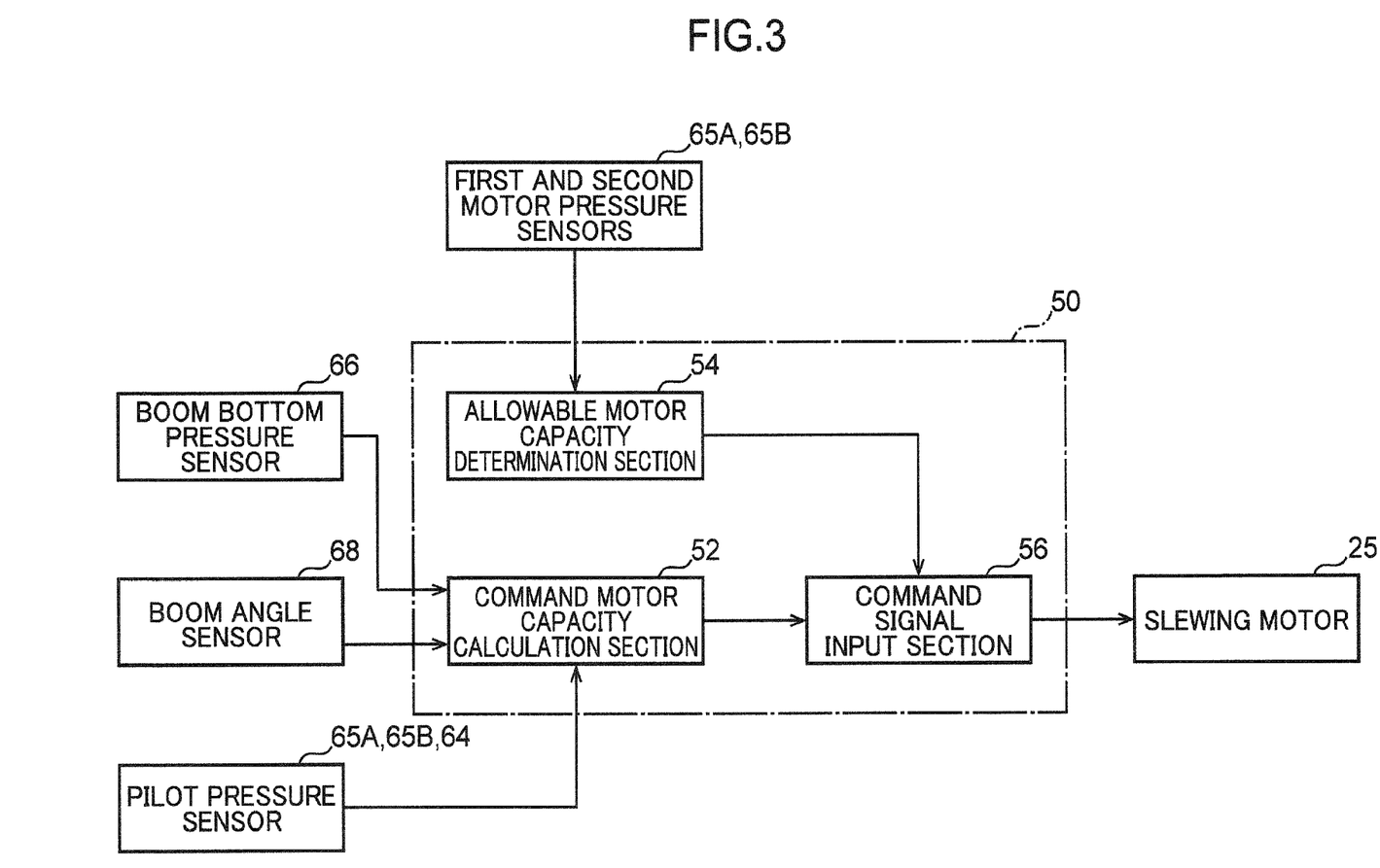
FIG. 3 is a block diagram showing a function of a controller connected to the hydraulic circuit.

The controller 50 includes, as functions for controlling the slewing motor capacity, a command motor capacity calculation section 52, an allowable motor capacity determination section 54, and a command signal input section 56, as shown in FIG. 3.

The command motor capacity calculation section 52 calculates a command motor capacity Qc, which is a command value on the slewing motor capacity, during the performance of a stewing operation, in which at least the stewing command operation is applied to the slewing control lever 45a. Specifically, the command motor capacity calculation section 52 performs the following operations.

(1) During Performance of Single Slewing Operation

When a command operation (i.e. the slewing command operation) is applied only to the stewing control lever 45a of the stewing operation unit 45 among the operation units corresponding to the actuator control valves that belong to the first group G1 while no command operation is applied to the other operation units, i.e., during performance of a single slewing operation in which the slewing command operation is applied to the slewing control lever 45a of the slewing operation unit 45 while no boom-raising command operation is applied to the boom control lever 46a of the boom operation unit 46 so as to allow hydraulic fluid discharged from the first main pump 31 to be supplied only to the slewing motor 25, the command motor capacity calculation section 52 sets the command motor capacity Qc to a predetermined base motor capacity Qo (cm³/rev). Besides, the command motor capacity calculation section 52 according to the present embodiment sets the command motor capacity Qc to the base motor capacity Qo not only during the performance of the above-mentioned single slewing operation but also when a command operation other than the boom-raising command operation is applied to any of the other operation units simultaneously with the application of the slewing control operation to the slewing operation unit 45 (including the case where a boom-lowering operation is applied to the boom control lever 46a). (2) During Performance of Slewing and Boom-Raising Operation During the performance of the slewing and boom-raising operation, in which the boom-raising command operation is applied to the boom control lever 46a and the slewing command operation is applied to the slewing control lever 45a, simultaneously, the command motor capacity calculation section 52 calculates the command motor capacity Qc (cm³/rev) based on the following formula (1).

$$Qc=Qo*Ra*Rp \quad (1)$$

In the formula (1), Ra denotes a first increase/decrease rate) by which the base motor capacity Qo is multiplied to increase or reduce the stewing motor capacity in accordance with the boom angle θb, and Rp denotes a second increase/decrease rate (%) by which the base motor capacity Qo is multiplied to increase or reduce the stewing motor capacity in accordance with the boom bottom pressure Pb, namely, the boom-raising driving pressure.

The command motor capacity calculation section 52 stores respective maps prepared in advance to calculate the first increase/decrease rate Ra and the second increase/decrease rate Rp based on the boom angle θb and the boom bottom pressure Pb, respectively. The command motor capacity calculation section 52, thus, determines the first increase/decrease rate Ra and the second increase/decrease rate Rp corresponding to the boom angle θb and the boom bottom pressure Pb, respectively, and multiplies the base motor capacity Qo by the determined first increase/decrease rate Ra and second increase/decrease rate Rp to thereby calculate the command motor capacity Qc.

Figure 4:
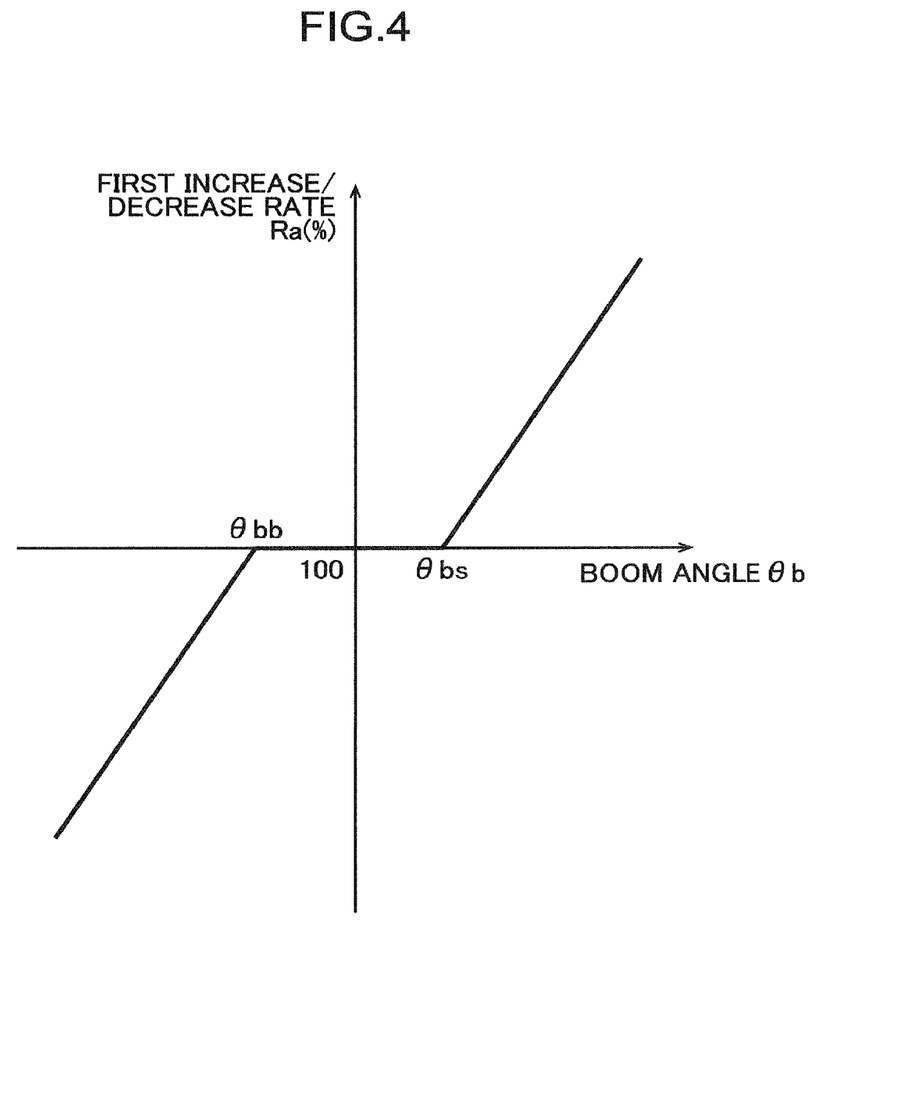
FIG. 4 is a graph showing the content of a map used for calculating a first increase/decrease rate corresponding to a boom angle, the map being stored in a command motor capacity calculation section of the controller.

FIG. 4 shows the content of the map for calculating the first increase/decrease rate Ra. As shown in FIG. 4, the first increase/decrease rate Ra is set based on the boom angle θb as follows.

(i) When the boom angle θb is within a middle angle range from a predetermined boom priority angle θbb to a predetermined stewing priority angle θbs, the boom priority angle θbb being set to be less than the stewing priority angle θbs (when θbb≤θb≤θbs), the first increase/decrease rate Ra is set to 100%. In summary, the first increase/decrease rate Ra is set to a value that renders the command motor capacity Qc equal to the base motor capacity Qo.

(ii) When the boom angle θb is greater than the stewing priority angle θbs (when θb>θbs), the first increase/decrease rate Ra is set to a value greater than 100%, the value increasing with the increase in the boom angle θb.

(iii) When the boom angle θb is less than the boom priority angle θbb (when θb<θbb), the first increase/decrease rate Ra is set to a value less than 100%, the value decreasing with decrease in the boom angle θb.

The slewing priority angle θbs and the boom priority angle θbb can be set to any value under the condition θbs≥θbb. The slewing priority angle θbs is preferably set to such an angle that the boom-rising motion can be sufficiently synchronized with the slewing motion, even with restricting the boom-raising speed to give priority to the slewing speed, when the boom angle θb is great enough to exceed the slewing priority angle θbs, for example, such an angle that the bucket 24 is raised from the ground to reach approximately a middle height. On the other hand, the boom priority angle θbb is preferably set to such an angle that the boom-rising motion is difficult to synchronize with the slewing motion without priority given to the boom-raising speed when the boom angle θb is less than the boom priority angle θbb, for example, such an angle that the bucket 24 is located at a height substantially flush with or below the ground on which the lower travelling body 10 is placed. In other words, the slewing priority angle θbs and the boom priority angle θbb are preferably set to such angles that there is low necessity for increase or decrease in the slewing motor capacity within the middle angle range between the angles (when θbb≤θb≤θbs).

Figure 5:
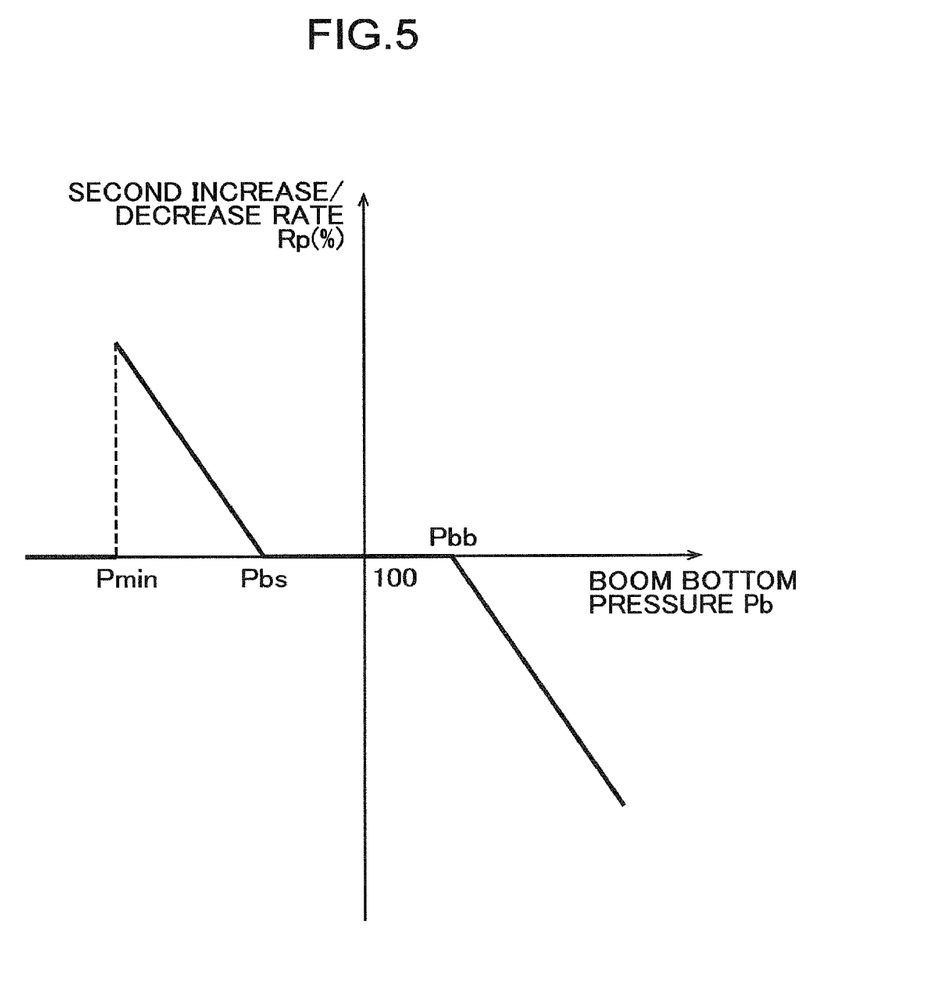
FIG. 5 is a graph showing the content of a map used for calculating a second increase/decrease rate corresponding to a boom bottom pressure, the map being stored in the command motor capacity calculation section of the controller.

FIG. 5 shows the content of the map for calculating the second increase/decrease rate Rp. As shown in FIG. 5, the second increase/decrease rate Rp is set based on the boom bottom pressure Pb as follows.

(i) When the boom bottom pressure Pb is within a middle bottom pressure range from a predetermined slewing priority bottom pressure (slewing priority drive pressure) Pbs to a predetermined boom priority bottom pressure (boom priority drive pressure) Pbb, the slewing priority bottom pressure being less than the boom priority bottom pressure (middle drive pressure range: Pbs≤Pb≤Pbb), the second increase/decrease rate Rp is set to 100%. In summary, the second increase/decrease rate Rp is set to a value that makes no change in the command motor capacity Qc.

(ii) When the boom bottom pressure Pb is greater than the boom priority bottom pressure Pbb (when Pb>Pbb), the second increase/decrease rate Rp is set to a value less than 100%, the value decreasing with increase in the boom bottom pressure Pb.

(iii) When the boom bottom pressure Pb is less than the slewing priority bottom pressure (when Pb<Pbs), the second increase/decrease rate Rp is set to a value greater than 100%, the value increasing with decrease in the boom bottom pressure Pb. However, when the boom bottom pressure Pb is less than a predetermined minimum bottom pressure (minimum drive pressure) Pmin further less than the slewing priority bottom pressure Pbs (when Pb<Pmin), the second increase/decrease rate Rp is set to 100%.

Each of the boom priority bottom pressure Pbb, the slewing priority bottom pressure Pbs, and the minimum bottom pressure Pmin can be set to any value under the condition Pbb≥Pbs>Pmin. The boom priority bottom pressure Pbb is preferably set to such a pressure value that the boom-rising motion is difficult to synchronize with the slewing motion without securing the flow rate for the boom-raising operation when the boom bottom pressure Pb is greater than the boom priority bottom pressure Pbb (because of the large load required for the boom-rising motion). On the other hand, the slewing priority bottom pressure Pbs is preferably set to such a pressure value that the boom-rising motion can be synchronized with the slewing motion, even with giving priority to the slewing speed, when the boom bottom pressure Pb is small enough to be less than the slewing priority bottom pressure Pbs (when the load required for the boom-rising motion is small). In other words, the boom priority bottom pressure Pbb and the slewing priority bottom pressure Pbs are preferably set to such pressure values that there is low necessity for increase or decrease in the slewing motor capacity within the middle bottom pressure range between the values (Pbs≤Pb≤Pbb). Besides, the minimum bottom pressure Pmin is preferably set to such a pressure value that the boom bottom pressure Pb can be presumed not to correspond to the actual boom-raising drive load due to, for example, contact of the distal end of the bucket 24 with the ground G, when the detected boom bottom pressure Pb is less than the minimum bottom pressure Pmin (for example, a pressure value less than the dead load of the working device 14).

The allowable motor capacity determination section 54 calculates an allowable motor capacity Qa (cm$^3$/rev) based on a predetermined motor allowable torque Ta (N·m) preset for the slewing motor 25 and first and second motor pressures P1 and P2, which are respective pressures of hydraulic fluid at the first port 25$a$ and the second port 25$b$ of the slewing motor 25, according to the following formula (2).

$$Qa=2\pi*Ta/\Delta Pm \quad (2)$$

In the formula (2), ΔPm denotes an effective differential pressure of the slewing motor 25, i.e. ΔPm=|P1−P2| (MPa). Herein, the mechanical efficiency of the slewing motor 25 is assumed to be 1.

The command signal input section 56 basically generates, based on the command motor capacity Qc calculated by the command motor capacity calculation section 52, a capacity command signal to make the actual slewing motor capacity be the command motor capacity Qc and inputs the signal to the regulator 29 of the slewing motor 25. However, when the command motor capacity Qc is greater than the allowable motor capacity Qa determined by the allowable motor capacity determination section 54, the command signal input section 56 generates a capacity command signal to make the slewing motor capacity be not the command motor capacity Qc but the allowable motor capacity Qa, and inputs the signal to the regulator 29.

Figure 6:
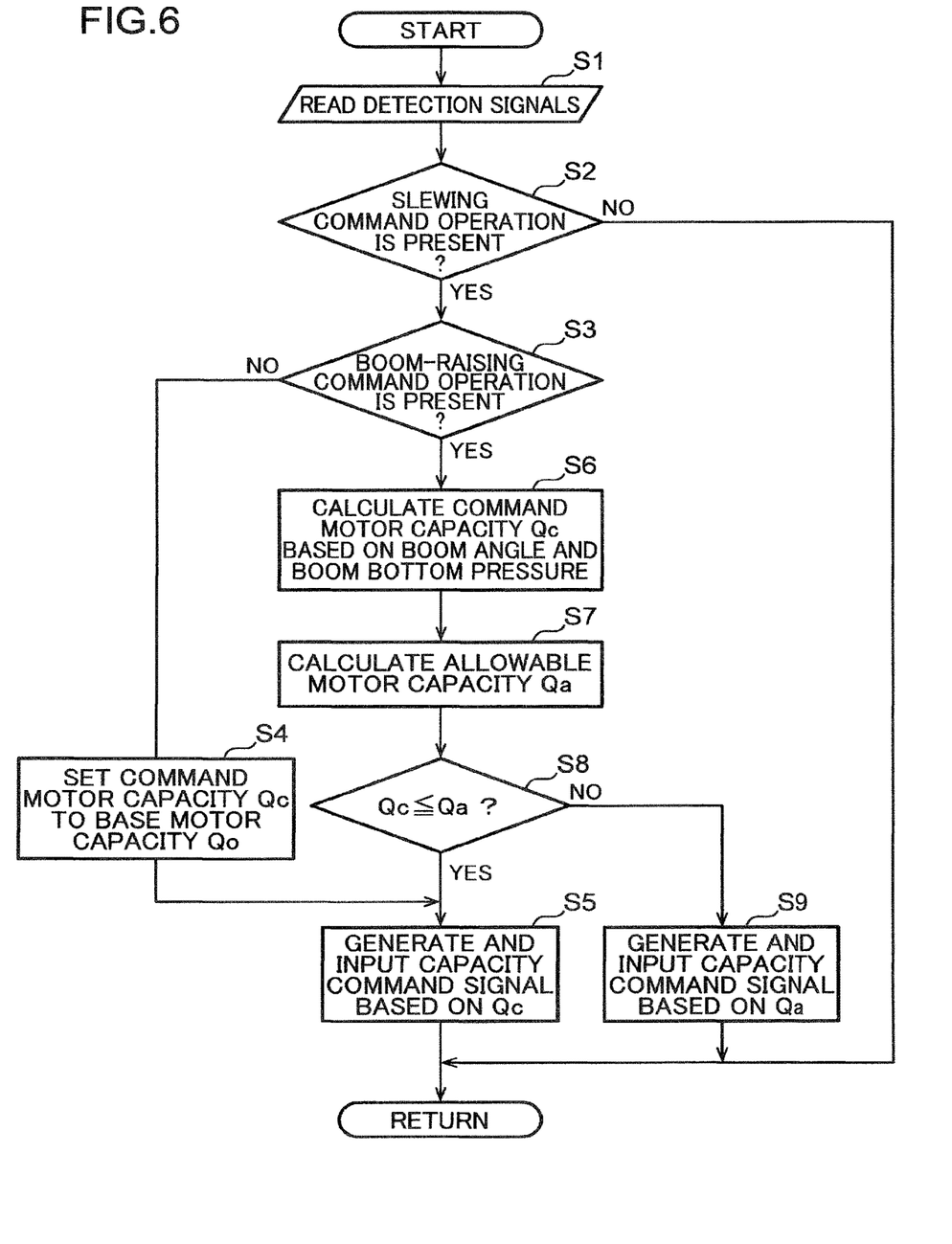
FIG. 6 is a flowchart showing arithmetic control operations performed by the controller.

FIG. 6 is a flowchart showing arithmetic control operations performed by the controller 50 with respect to the slewing motor capacity.

The controller 50 reads the detection signals that are input thereto (step S1). The command motor capacity calculation section 52 of the controller 50 judges, based on the pilot pressure detection signals, presence/absence of the slewing command operation to be applied to the slewing operation unit 45 and presence/absence of the boom-raising command operation to be applied to the boom operation unit 46 (steps S2 and S3).

If the slewing control operation is absent (NO at step S2), the command motor capacity calculation section 52 performs no calculation of the command motor capacity Qc, for there is no need to control the slewing motor capacity. If the slewing control operation is present (YES at step S2) but the boom-raising command operation is absent (NO at step S3), for example, when the single slewing operation is performed for the first main pump 31, the command motor capacity calculation section 52 sets the command motor capacity Qc to the base motor capacity Qo (step S4). The command signal input section 56 of the controller 50 generates the capacity command signal to make the actual slewing motor capacity be the command motor capacity Qc, which is the base motor capacity Qo, and inputs the signal to the regulator 29 of the slewing motor 25 (step S5). This allows the slewing motion with no boom-rising motion (including a single slewing motion) to be made with the slewing motor capacity equal to the base motor capacity Qo.

If both the slewing control operation and the boom-raising control operation are present (YES at steps S2 and S3), that is, if the slewing and boom-raising operation is performed, the command motor capacity calculation section 52 determines the first increase/decrease rate Ra and the second increase/decrease rate Rp corresponding to the boom angle θb and the boom bottom pressure Pb, respectively, by use of the maps shown in FIGS. 4 and 5, and calculates the command motor capacity Qc by multiplying the base motor capacity Qo by the determined first increase/decrease rate Ra and second increase/decrease rate Rp (step S6). On the other hand, the allowable motor capacity determination section 54 calculates the allowable motor capacity Qa based on the predetermined motor allowable torque Ta and the effective differential pressure ΔPm of the slewing motor 25 (step S7).

The command signal input section 56 compares the command motor capacity Qc with the allowable motor capacity Qa and, if the command motor capacity Qc is equal to or less than the allowable motor capacity Qa (YES at step S8), generates the capacity command signal to make the actual slewing motor capacity be the command motor capacity Qc and inputs the signal to the regulator 29 (step S5). This allows the slewing and boom-raising operation to be performed with the stewing motor capacity equal to the command motor capacity Qc. The control of the slewing motor capacity based on the command motor capacity Qc has the following technical significance.

First, regarding the boom angle θb, when the boom angle θb exceeds the predetermined slewing priority angle θbs, the command motor capacity calculation section 52, which multiplies the base motor capacity Qo by the first increase/decrease rate Ra of greater than 100% to calculate the command motor capacity Qc, enables the control of increasing the slewing motor capacity to give priority to the slewing speed to be performed, thereby allowing the working efficiency to be effectively improved. Furthermore, since the boom angle θb exceeds the slewing priority angle θbs and the working device 14 has reached a relatively high position, the boom angle θb can eventually reach a target angle at the point in time when the working device reaches a predetermined slewing angle position even with reduction in the boom-raising speed because of the priority given to the slewing speed (the priority given to the slewing motor flow rate).

On the other hand, when the boom angle θb is less than the boom priority angle θbb that is set to be less than the slewing priority angle θbs, that is, when the working device 14 is located at a very low position, the command motor capacity calculation section 52, which makes the first increase/decrease rate Ra be a value less than 100% to reduce the slewing motor capacity, allows the boom-raising speed to be increased to allow the boom 20 to be quickly raised to a height at a certain level.

Besides, when the boom angle θb is within the middle angle range from the boom priority angle θbb to the slewing priority angle θbs, the command motor capacity calculation section 52, which sets the first increase/decrease rate Ra to 100%, restricts the difference between the command motor capacity Qc and the base motor capacity Qo to reduce the difference in the characteristics of the slewing motor capacity between the single stewing operation and the stewing and boom-raising operation and stabilizes the characteristics in a broad range. This in turn makes it possible to reduce the sense of discomfort felt by the operator.

In addition, regarding the boom bottom pressure Pb, when the boom bottom pressure Pb exceeds the predetermined boom priority bottom pressure Pbb, the command motor capacity calculation section 52, which multiplies the base motor capacity Qo by a second increase/decrease rate of less than 100% to decrease the command motor capacity Qc, enables the boom-rising motion to be synchronized with the slewing motion at a sufficient speed, even with large load required for the boom-rising motion.

Conversely, when the boom bottom pressure Pb is less than the slewing priority bottom pressure Pbs that is set to be less than the boom priority bottom pressure Pbb, that is, when the load required for the boom-rising motion is small, the command motor capacity calculation section 52, which sets the second increase/decrease rate Rp to a value greater than 100% to increase the command motor capacity Qc, allows the slewing speed to be increased to improve the working efficiency effectively. Moreover, when the boom bottom pressure Pb is less than the minimum bottom pressure Pmin that is further less than the slewing priority bottom pressure Pbs, that is, the detection of the bottom pressure corresponding to the actual load required for the boom-raising operation is presumed to be difficult due to contact of the bucket 24 with the ground, or the like, the command motor capacity calculation section 52 sets the second increase/decrease rate Rp to 100% to cancel increasing/decreasing the command motor capacity Qc based on the boom bottom pressure Pb, thereby preventing inappropriate priority from being given to the slewing speed.

Besides, when the boom bottom pressure Pb is within the middle bottom pressure range from the slewing priority bottom pressure Pbs to the boom priority bottom pressure Pbb, the command motor capacity calculation section 52, which sets the second increase/decrease rate Rp to 100% to cancel the increase/decrease in the command motor capacity Qc based on the boom bottom pressure Pb, restricts the difference in the characteristics of the slewing motor capacity between the single slewing operation and the slewing and boom-raising operation and stabilizes the characteristics in a broad range; this makes it possible to suppress the sense of discomfort felt by the operator.

In the flowchart shown in FIG. 6, when the command motor capacity Qc exceeds the allowable motor capacity Qa (NO at step S8), the command signal input section 56 generates the capacity command signal to make the actual slewing motor capacity be not the command motor capacity Qc but the allowable motor capacity Qa, and inputs the signal to the regulator 29 (step S9). This enables the slewing motor 25 to be prevented from being driven by a torque greater than the motor allowable torque Ta thereof, regardless of the command motor capacity Qc.

The present invention is not limited to the above-described embodiment. The present invention may be configured as follows, for example.

(A) Regarding Increase/Decrease in Command Motor Capacity Based on Boom Angle

Although the command motor capacity Qc according to the above-described embodiment is set so as to increase continuously from the base motor capacity Qo with increase in the boom angle θb exceeding the slewing priority angle θbs as shown in FIG. 4, the characteristics of the command motor capacity according to the present invention is not limited thereto. For example, when the boom angle is greater than the slewing priority angle, it is also possible to set the command motor capacity to a constant value greater than the base motor capacity. Similarly, when the boom angle is less than the boom priority angle, it is also possible to set the command motor capacity to a constant value less than the base motor capacity. However, the above-mentioned characteristics of the command motor capacity Qc that increases and decreases from the base motor capacity Qo in response to the increase and decrease in the boom angle makes it possible to suppress impact due to a sudden change in the slewing speed and thereby reduce the sense of discomfort felt by the operator. Besides, the command motor capacity may be increased and decreased not continuously but, for example, stepwise.

The slewing priority angle and the boom priority angle may be equal to each other. However, keeping the command motor capacity Qc set to the base motor capacity Qa in the middle angle range from the boom priority angle θbb to the slewing priority angle θbs wherein the slewing priority angle θbs is greater than the boom priority angle θbb, as in the above-described embodiment, allows the command motor capacity Qc to be stabilized within the predetermined range in which there is low necessity for increase/decrease in the slewing motor capacity, thereby making it possible to suppress the sense of discomfort felt by the operator.

Besides, the present invention does not absolutely require setting the boom priority angle. For example, when the boom angle is equal to or less than the slewing priority angle, the command motor capacity may be uniformly set to the base motor capacity.

(B) Regarding Increase/Decrease in Command Motor Capacity Based on Boom-Raising Drive Pressure Although the command motor capacity Qc according to the above-described embodiment is changed to continuously decrease from the base motor capacity Qo with increase in the boom bottom pressure Pb corresponding to the boom-raising driving pressure and exceeding the boom priority bottom pressure Pbb as shown in FIG. 5, the characteristics of the command motor capacity according to the present invention is not limited thereto. For example, when the boom-raising driving pressure is greater than the boom priority drive pressure, the command motor capacity may be set to a constant value less than the base motor capacity. Similarly, when the boom-raising driving pressure is less than the slewing priority drive pressure, the command motor capacity may be set to a constant value greater than the base motor capacity. However, reducing and increasing the command motor capacity Qc from the base motor capacity Qo in response to the increase and decrease in the boom bottom pressure Pb as described above makes it possible to suppress the impact due to a sudden change in the slewing speed to thereby suppress the sense of discomfort felt by the operator. Besides, the command motor capacity may be changed based on not a continuous change characteristics but a stepwise change characteristics.

The boom priority drive pressure and the slewing priority drive pressure may be equal to each other. However, releasing the change in the command motor capacity based on the boom-raising driving pressure in the middle drive pressure range from the slewing priority drive pressure to the boom priority drive pressure that is greater than the slewing priority drive pressure similarly to the above-described embodiment makes it possible to stabilize the command motor capacity within the predetermined range in which there is a low necessity for increase/decrease in the slewing motor capacity to thereby suppress the sense of discomfort felt by the operator.

Besides, the present invention does not absolutely require setting the slewing priority drive pressure. For example, when the boom-raising driving pressure is less than the boom priority drive pressure, the command motor capacity may be uniformly set to the base motor capacity. The above-mentioned setting of the minimum drive pressure may also be omitted according to the specification.

Furthermore, it can be also omitted to change the command motor capacity based on the boom-raising driving pressure. In other words, the command motor capacity may be calculated based on only the boom angle.

(C) Regarding Allowable Motor Capacity

The present invention permits the determination of the allowable motor capacity and the restriction of the slewing motor torque based on the allowable motor capacity to be omitted. For example, in the case of increasing and decreasing the command motor capacity within a range substantially less than the allowable motor capacity, the allowable motor capacity does not have to be particularly considered.

(D) Regarding Common Hydraulic Pump

Although the first main pump 31 according to the above-described embodiment is commonly used for both the slew driving and increasing the speed of the boom-rising motion (joining hydraulic fluid for speed increasing with the hydraulic fluid discharged from the second main pump 32), the hydraulic pump according to the present invention may be commonly used for both the slew driving and mainly boom driving (not speed-increasing).

As described above, there is provided a slewing hydraulic work machine capable of efficiently performing slewing and boom-raising operation where a slewing motion of an upper slewing body and a rising motion of a boom are simultaneously made by use of hydraulic fluid discharged from a common hydraulic pump, with simple control.

Provided is a slewing hydraulic work machine, comprising: a lower travelling body; an upper slewing body slewably mounted on the lower travelling body; a working device mounted on the upper slewing body and including a boom connected to the upper slewing body so as to be raisable and lowerable; a hydraulic pump that discharges hydraulic fluid; a slewing motor formed of a variable displacement hydraulic motor that is driven by hydraulic fluid supplied from the hydraulic pump, the slewing motor configured to slew the upper stewing body in response to the supply of hydraulic fluid; a slewing control device that controls a direction and a flow rate of hydraulic fluid supplied from the hydraulic pump to the slewing motor in accordance with a slewing command operation applied to the slewing control device for slewing the upper slewing body; a boom cylinder that is operated, by hydraulic fluid supplied from the hydraulic pump to raise and lower the boom; a boom control device that controls a flow rate of the hydraulic fluid supplied from the hydraulic pump to the boom cylinder in accordance with a boom-raising command operation applied to the boom control device for actuating the boom in a rising direction; a boom angle detector that detects a boom angle that is a rising angle of the boom; and a capacity control section that controls a stewing motor capacity, which is a capacity of the stewing motor. The capacity control section includes a command motor capacity calculation section that calculates a command motor capacity, which is a command value on the stewing motor capacity, based on the boom angle detected by the boom angle detector, and a command signal input section that generates a capacity command signal corresponding to the command motor capacity and inputs the capacity command signal to the stewing motor to thereby make the stewing motor capacity be a capacity corresponding to the command motor capacity. The command motor capacity calculation section is configured to set the command motor capacity to a predetermined base capacity or a capacity less than the base capacity when the boom angle is equal to or less than a predetermined stewing priority angle during a performance of a stewing and boom-raising operation in which the stewing command operation is applied to the stewing control device and the boom-raising command operation is applied to the boom control device simultaneously, and configured to set the command motor capacity to a value greater than the base capacity when the boom angle is greater than the stewing priority angle during the performance of the stewing and boom-raising operation.

According to this stewing hydraulic work machine, the capacity control section inputs to the stewing motor the capacity command signal based on the command motor capacity equal to or less than the base motor capacity when the boom angle is equal to or less than the stewing priority angle during the performance of the stewing and boom-raising operation, thereby allowing high flow rate of the portion of the hydraulic fluid discharged from the hydraulic pump that is supplied to the boom cylinder to be ensured to enable the boom to make a rising motion at a sufficient speed to synchronize with the slewing motion of the upper slewing body. On the other hand, the capacity control section inputs to the stewing motor the capacity command signal based on the command motor capacity greater than the base motor capacity when the boom angle is greater than the slewing priority angle during the performance of the slewing and boom-raising operation, thereby increasing the stewing speed of the upper stewing body to improve the working efficiency.

The command motor capacity calculation section is preferably configured to set the command motor capacity to the base capacity during a performance of a single slewing operation in which the stewing command operation is applied to the stewing control device so as to cause hydraulic fluid discharged from the hydraulic pump to be supplied only to the slewing motor. Thus rendering the base motor capacity equal to the capacity that is set during the performance of the single stewing operation makes it possible to simplify the control and to suppress the sense of discomfort felt by an operator.

The command motor capacity calculation section is preferably configured to set the command motor capacity to a value greater than the base motor capacity, the value increasing with increase in the boom angle, when the boom angle is greater than the stewing priority angle during the performance of the stewing and boom-raising operation. Such control based on the command motor capacity makes it possible to suppress an impact due to a sudden increase in the slewing motion to thereby smoothly increase the slewing speed accompanying the boom-raising operation without giving a significant sense of discomfort to the operator.

On the other hand, the command motor capacity calculation section is preferably configured to set the command motor capacity to a value less than the base motor capacity when the boom angle is less than a boom priority angle that is set at a value equal to or less than the slewing priority angle during the performance of the slewing and boom-raising operation. This control of setting the slewing motor capacity to the value less than the base motor capacity to increase the hydraulic fluid supplied from the hydraulic pump to the boom cylinder, that is, giving priority to the boom-raising speed over the slewing speed, when the boom angle is very small, that is, when the working device is at a very low position which causes a need for priority to the boom-raising operation, enables the boom to be quickly raised to an appropriate angle Also in this case, the command motor capacity calculation section is preferably configured to set the command motor capacity to a value less than the base motor capacity, the value decreasing with decrease in the boom angle, when the boom angle is less than the boom priority angle during the performance of the slewing and boom-raising operation. Such control based on the command motor capacity makes it possible to suppress an impact due to a sudden decrease in the boom-raising speed accompanying an increase in the boom angle to thereby smoothly reduce the boom-raising speed without giving a significant sense of discomfort to the operator.

The boom priority angle may be equal to the slewing priority angle; however, it is preferable that the boom priority angle is less than the slewing priority angle and that the command motor capacity calculation section is configured to keep the command motor capacity at the base motor capacity when the boom angle is within a middle angle range from the boom priority angle to the slewing priority angle during the performance of the slewing and boom-raising. This control of keeping the slewing motor capacity at the constant base motor capacity (preferably, the capacity that is set during the performance of the single slewing operation) within the predetermined boom angle range, in which there is a low necessity for increase/decrease in the slewing speed and the boom-rising speed, even during the performance of the stewing and boom-raising operation, makes it possible to stabilize the characteristics of the actual stewing speed and boom-rising speed in response to the stewing command operation and the boom-raising command operation to thereby suppress the sense of discomfort felt by the operator.

It is preferable that: the slewing hydraulic work machine further comprises a boom-raising driving pressure detector that detects a boom-raising driving pressure, which is a pressure of the hydraulic fluid supplied to the boom cylinder during the performance of the slewing and boom-raising operation; the command motor capacity calculation section is configured to reduce the command motor capacity when the boom-raising driving pressure is greater than a predetermined boom priority drive pressure during the performance of the slewing and boom-raising operation; and the command signal input section is configured to generate the capacity command signal based on the command motor capacity having been reduced. This control enables the boom to be raised at a sufficient speed against the load required for the boom-rising motion when the boom-raising driving pressure is great, that is, the load is large (e.g. when a bucket holds a large amount of soil or when an attachment attached to a distal end of the working device is heavy).

On the other hand, it is preferable that the command motor capacity calculation section is configured to increase the command motor capacity when the boom-raising driving pressure is less than a slewing priority drive pressure that is set at a value equal to or less than the boom priority drive pressure during the performance of the slewing and boom-raising operation and the command signal input section is configured to generate the capacity command signal based on the command motor capacity having been increased. This control makes it possible to give priority to the slewing speed when the boom-raising driving pressure is small, that is, when the load required for the boom-raising operation is small, to thereby improve the working efficiency.

The slewing priority drive pressure may be equal to the boom priority drive pressure; however, it is preferable that the slewing priority drive pressure is less than the boom priority drive pressure and that the command motor capacity calculation section is configured to cancel changing the command motor capacity in accordance with the boom-raising driving pressure when the boom-raising driving pressure is within a middle drive pressure range from the slewing priority drive pressure to the boom priority drive pressure during the performance of the slewing and boom-raising operation. This control restricts the change in the slewing motor capacity from the base motor fcapacity in the predetermined boom drive pressure range in which there is a low necessity for increase/decrease in the slewing motor capacity, thereby restricting the difference in the slewing speed between the single stewing operation and the slewing and boom-raising operation to suppress the sense of discomfort felt by the operator.

It is preferable that the command motor capacity calculation section is configured to cancel changing the command motor capacity in accordance with the boom-raising driving pressure when the boom-raising driving pressure is less than a predetermined minimum drive pressure that is less than the slewing priority drive pressure (preferably, less than a boom-raising driving pressure corresponding to the dead weight of the working device). This cancel of the change of the slewing motor capacity makes it possible to prevent the slewing motor capacity from being inappropriately increased based on the value of the actually detected boom-raising driving pressure in spite of the difficulty of proper detection of the boom-raising driving pressure because of contact of the distal end of the working device with the ground or the like.

It is preferable that the slewing hydraulic work machine further comprises a motor differential pressure detector that detects an effective differential pressure of the slewing motor and an allowable motor capacity determination section that determines an allowable motor capacity based on an allowable torque set for the slewing motor and the effective differential pressure detected by the motor differential pressure detector, the command signal input section configured to generate a capacity command signal for setting the slewing motor capacity to the allowable motor capacity regardless of the command motor capacity when the command motor capacity calculated by the command motor capacity calculation section is greater than the allowable motor capacity. This control enables the slewing motor to be prevented from being driven by a torque greater than the allowable torque, regardless of the command motor capacity calculated by the command motor capacity calculation section and the effective differential pressure.

The invention claimed is:

1. A slewing hydraulic work machine, comprising:
   a lower travelling body;
   an upper slewing body slewably mounted on the lower travelling body;
   a working device mounted on the upper slewing body and including a boom connected to the upper slewing body so as to be raisable and lowerable;
   a hydraulic pump that discharges hydraulic fluid;
   a slewing motor formed of a variable displacement hydraulic motor that is driven by hydraulic fluid supplied from the hydraulic pump, the slewing motor configured to slew the upper slewing body in response to the supply of hydraulic fluid;
   a slewing control device that controls a direction and a flow rate of hydraulic fluid supplied from the hydraulic pump to the slewing motor in accordance with a slewing command operation applied to the slewing control device for slewing the upper slewing body;
   a boom cylinder that is operated, by hydraulic fluid supplied from the hydraulic pump, to raise and lower the boom;
   a boom control device that controls a flow rate of the hydraulic fluid supplied from the hydraulic pump to the boom cylinder in accordance with a boom-raising command operation applied to the boom control device for actuating the boom in a rising direction;
   a boom angle detector that detects a boom angle that is a rising angle of the boom; and
   a capacity control section that controls a slewing motor capacity, which is a capacity of the slewing motor, wherein:
   the capacity control section includes a command motor capacity calculation section that calculates a command motor capacity, which is a command value on the slewing motor capacity, based on the boom angle detected by the boom angle detector, and a command signal input section that generates a capacity command signal corresponding to the command motor capacity and inputs the capacity command signal to the slewing motor to thereby make the slewing motor capacity be a capacity corresponding to the command motor capacity; and
   the command motor capacity calculation section is configured to set the command motor capacity to a predetermined base capacity or a capacity less than the base capacity when the boom angle is equal to or less than a predetermined slewing priority angle during a performance of a slewing and boom-raising operation in which the slewing command operation is applied to the slewing control device and the boom-raising command operation is applied to the boom control device simultaneously, and configured to set the command motor capacity to a capacity greater than the base capacity when the boom angle is greater than the slewing priority angle during the performance of the slewing and boom-raising operation.

2. The slewing hydraulic work machine according to claim 1, wherein the command motor capacity calculation section is configured to set the command motor capacity to the base capacity during a performance of a single slewing operation in which the slewing command operation is applied to the slewing control device so as to cause hydraulic fluid discharged from the hydraulic pump to be supplied only to the slewing motor.

3. The slewing hydraulic work machine according to claim 1, wherein the command motor capacity calculation section is configured to set the command motor capacity to the capacity greater than the base capacity, the capacity greater than the base capacity increasing with increase in the boom angle, when the boom angle is greater than the slewing priority angle during the performance of the slewing and boom-raising operation.

4. The slewing hydraulic work machine according to claim 1, wherein the command motor capacity calculation section is configured to set the command motor capacity to the capacity less than the base capacity when the boom angle is less than a boom priority angle that is set at a value equal to or less than the slewing priority angle during the performance of the slewing and boom-raising operation.

5. The slewing hydraulic work machine according to claim 4, wherein the command motor capacity calculation section is configured to set the command motor capacity to the capacity less than the base capacity, the the capacity less than the base capacity decreasing with decrease in the boom angle, when the boom angle is less than the boom priority angle during the performance of the slewing and boom-raising operation.

6. The slewing hydraulic work machine according to claim 4, wherein the boom priority angle is less than the slewing priority angle, and wherein the command motor capacity calculation section is configured to keep the command motor capacity at the base capacity when the boom angle is within a middle angle range from the boom priority angle to the slewing priority angle during the performance of the slewing and boom-raising.

7. The slewing hydraulic work machine according to claim 1, the slewing hydraulic work machine further comprises a boom-raising driving pressure detector that detects a boom-raising driving pressure, which is a pressure of the hydraulic fluid supplied to the boom cylinder during the performance of the slewing and boom-raising operation, wherein the command motor capacity calculation section is configured to reduce the command motor capacity when the boom-raising driving pressure is greater than a predetermined boom priority drive pressure during the performance of the slewing and boom-raising operation and wherein the command signal input section is configured to generate the capacity command signal based on the command motor capacity having been reduced.

8. The slewing hydraulic work machine according to claim 7, wherein the command motor capacity calculation section is configured to increase the command motor capacity when the boom-raising driving pressure is less than a slewing priority drive pressure that is set at a value equal to or less than the boom priority drive pressure during the performance of the slewing and boom-raising operation and the command signal input section is configured to generate the capacity command signal based on the command motor capacity having been increased.

9. The slewing hydraulic work machine according to claim 8, wherein the slewing priority drive pressure is less than the boom priority drive pressure, and wherein the command motor capacity calculation section is configured to cancel changing the command motor capacity in accordance with the boom-raising driving pressure when the boom-raising driving pressure is within a middle drive pressure range from the slewing priority drive pressure to the boom priority drive pressure during the performance of the slewing and boom-raising operation.

10. The slewing hydraulic work machine according to claim 8, wherein the command motor capacity calculation section is configured to cancel changing the command motor capacity in accordance with the boom-raising driving pressure when the boom-raising driving pressure is less than a predetermined minimum drive pressure that is less than the slewing priority drive pressure.

11. The slewing hydraulic work machine according to claim 1, further comprising a motor differential pressure detector that detects an effective differential pressure of the slewing motor and an allowable motor capacity determination section that determines an allowable motor capacity based on an allowable torque set for the slewing motor and the effective differential pressure detected by the motor differential pressure detector, wherein the command signal input section is configured to generate the capacity command signal for setting the slewing motor capacity to the allowable motor capacity when the command motor capacity calculated by the command motor capacity calculation section is greater than the allowable motor capacity.

* * * * *